Patented Nov. 8, 1938

2,136,146

UNITED STATES PATENT OFFICE 2,136,146

ANTHRAQUINONE-NAPHTHACRIDONE DYE-STUFF

Wilhelm Moser, Riehen, and Walter Fioroni, Binningen, Switzerland, assignors to the firm of Society of Chemical Industry in Basle, Basel, Switzerland No Drawing. Original application January 9, 1937, Serial No. 119,888. Divided and this application January 3, 1938, Serial No. 183,228. In Switzerland January 10, 1936

1 Claim. (Cl. 260—276)

This invention relates to the manufacture of new dyestuffs of the anthraquinone naphthacridone series by treating with a condensing agent an anthraquinone derivative which has at least 1 mol of the atom grouping

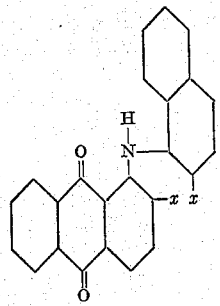

in which the one $x$ stands for hydrogen and the other $x$ for a COOR-group, OR being OH, O-alkyl or halogen. The new anthraquinonenaphthacridones thus produced contain at least once the atom grouping

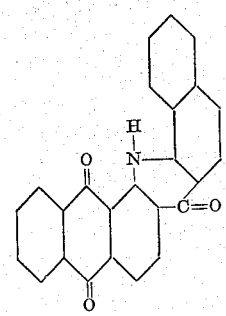

and are valuable dyestuffs or intermediate products for obtaining dyestuffs. These dyestuffs represent therefore the N-$\alpha$:$\alpha'$-anthraquinone-naphthacridones. The new dyestuffs are distinguished from the comparable naphthacridone dyestuffs by valuable properties, particularly by their levelling capacity. They are dark powders dissolving in sulfuric acid to orange, to brown, to olive and black-blue solutions, yielding with hydrosulfite and caustic soda solution, brown to brown-red, violet-red and Bordeaux red vats, and dyeing the vegetable fiber Bordeaux red to violet, to green, to grey and brown tints.

The compounds which contain at least once the atom grouping

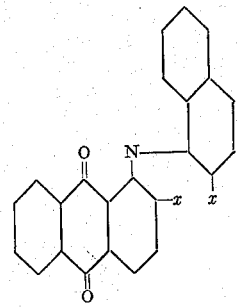

have not yet been described. They may be obtained by the known analogous processes, for example by condensing an aminoanthraquinone with an $\alpha$-chlornaphthalene, the parent materials being so chosen that one of them contains in the $\beta$-position adjacent to the $\alpha$-position a COOR-group (R representing H or alkyl).

Such compounds are, for example, the condensation products from 1-aminoanthraquinone-2-carboxylic acid ethyl ester and $\alpha$-chloronaphthalene; 1 mol 1:4-diaminoanthraquinone and 2 mols 1-chloronaphthalene-2-carboxylic acid ethyl ester; 1 mol 1:5-diaminoanthraquinone and 2 mols 1-chloronaphthalene-2-carboxylic acid ethyl ester; 1 mol 1-amino-4-benzoylaminoanthraquinone and 1 mol 1-chloronaphthalene-2-carboxylic acid ethyl ester; 1 mol 1-amino-5-benzoylaminoanthraquinone and 1 mol 1-chloronaphthalene-2-carboxylic acid ethyl ester; the condensation product from 1 mol 1:4-dichloronaphthalene and 2 mols 1-chloroaminoanthraquinone-2-carboxylic acid ethyl ester; the condensation product from 1 mol 4:4'-diamino-1:1'-dianthraquinonylamine and 2 mols 1-chloronaphthalene-2-carboxylic acid.

As condensing agents capable of converting the above compounds into acridone derivatives there come into question those which are used for similar reactions provided that they do not simultaneously have a sulfonating action. Such agents or processes are, for example, the treatment with reducing agents in the presence of alkalies, for instance vatting (if x stands for a COOH-group or a COO-alkyl group); agents which convert the COOR-group into the CO-halogen group and then close the ring; agents which withdraw water or the like.

The new acridone derivatives which contain reactive groups may further be condensed with certain compounds, for instance the new acridone derivative of the formula

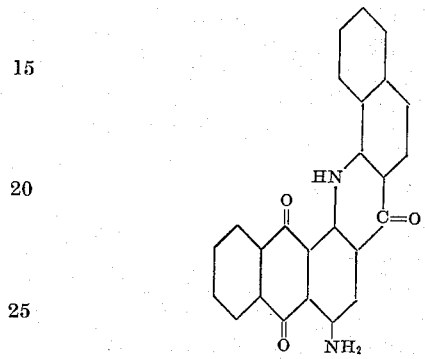

will react with compounds having reactive halogen atoms, for instance α-chloranthraquinones. The anthrimides thus obtained may then undergo further reactions which are characteristic of the anthrimides, for example they may be subjected to carbazolation. In spite of the presence of the carbazol ring the dyestuffs thus obtained belong to the N-α:α'-anthraquinonenaphthacridone. Particularly valuable among the N-α:α'-anthraquinonenaphthacridones are quite generally those which correspond to the general formula

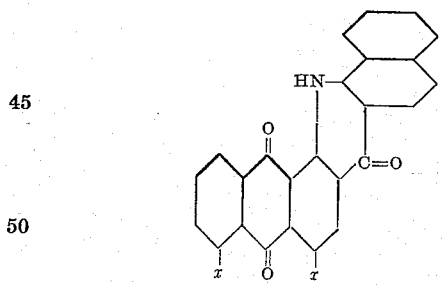

in which one $x$ stands for a hydrogen atom and the other $x$ stands for a NH-$y$ group, wherein $y$ represents a radical selected from the group of radicals consisting of aroyl radicals, anthraquinonyl radicals and the carbazolanthraquinonyl radicals deriving therefrom, which products are dark powders, dissolving in sulfuric acid to orange, to brown, to olive and black-blue solutions, yielding with hydrosulfite and caustic soda solution brown to brown-red, violet-red and Bordeaux-red vats, and dyeing the vegetable fiber Bordeaux red to violet, to green, to grey and brown tints.

The new acridone derivatives may be halogenated, nitrated and subsequently reduced and if desired acylated, new dyestuffs being obtained. Acridone derivatives may be produced which in addition to the acridone grouping here characterized contain other acridone groupings.

The following examples illustrate the invention, the parts being by weight; the ratio of parts by weight to parts by volume is that which exists between the kilo and the litre:—

Example 1

10 part of 1-($\alpha_1$naphthylamino-$\beta_1$-carboxylic acid ethyl ester)-4-benzoylaminoanthraquinone ground wet are vatted in 600 parts of water by means of 30 parts of sodium hydroxide solution of 30 per cent. strength and 15 parts of sodium hydrosulfite for 1 hour at 65–70° C.; the mass is filtered, the filtrate oxidized by blowing in air and again filtered; the solid matter is washed neutral and dried. The dyestuff thus obtained is a 4-benzoylamino-1-α-naphthanthraquinone acridone of the formula

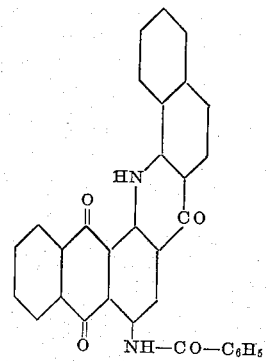

It is a dark powder which dyes cotton very low and level greenish gray in a violet red vat, the sulfuric acid solution is orange and when poured into water yields green-gray flocks.

Similar products are obtained when using the corresponding 4-(4'-chloro)-benzoylaminoanthraquinone or 4-(3'-methoxy)-benzoylaminoanthraquinone derivatives instead of the 1-($\alpha_1$-1-naphthylamino-$\beta_1$-carboxylic acid-ethyl ester)-4-benzoylaminoanthraquinone, or exchanging the aroyl radicals of the benzene series for other acyl radicals, such as those of the phenoxy-acetic acid or of the furane carboxylic acid.

The 1-($\alpha_1$-naphthylamino-$\beta_1$-carboxylic acid ethyl ester)-4-benzoylaminoanthraquinone may be made as follows:—

34.2 parts of 1-amino-4-benzoylaminoanthraquinone, 23.4 parts of 1-chloronaphthalene-2-carboxylic acid ethyl ester, 12 parts of anhydrous sodium carbonate and 0.6 part of anhydrous cupric chloride are mixed together in 240 parts of nitrobenzene and the mixture is boiled for 20 hours under reflux. When the mixture is cooled it is filtered and the solid matter is washed with a little nitrobenzene, then with toluene and alcohol and finally with water and then treated with hydrochloric acid, washed neutral and dried.

The crystalline blue body thus obtained is a 1-($\alpha_1$-naphthylamino-$\beta_1$-carboxylic acid ethyl ester)-4-benzoylaminoanthraquinone. It dissolves to an olive brown solution in sulfuric acid; when this solution is poured into water yellow brown flocks are produced.

The 4-benzoylamino-α:α'-naphthanthraquinoneacridone can also be produced by condensing the 1-($\alpha_1$-naphthylamino-$\beta_1$-carboxylic acid)-4-benzoylaminoanthraquinone as indicated in Example 1.

An isomeric 5-benzoylamino-α:α'-naphthanthraquinoneacridone which dyes brown tints from a violet vat can be obtained from 1-amino-5-benzoylaminoanthraquinone.

Example 2

26 parts of 5-aminoanthraquinone-1:1′:2:2′-naphthacridone of the formula

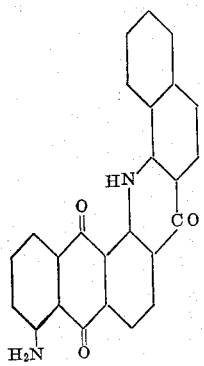

(obtained by saponification of the corresponding benzoylamino compound in sulfuric acid of 66° Bé. at 90° C.) are boiled for 20 hours in a reflux apparatus with 17.2 parts of 1-chloroanthraquinone, 8 parts of anhydrous sodium carbonate, and 0.4 parts of anhydrous copper chloride in 250 parts by weight of nitrobenzene. After cooling the mixture is sucked off, washed with little nitrobenzene, then with toluene and alcohol and finally with water, until neutral and then dried.

The new condensation product thus obtained of the formula

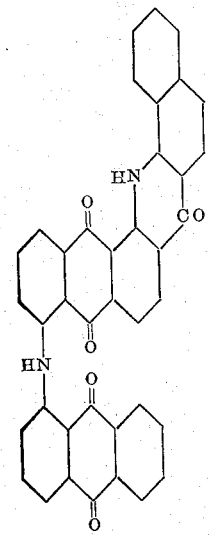

dissolves in concentrated sulfuric acid to brown-orange solutions. When precipitated in water there are formed violet flocks. Cotton is dyed from a red vat brownish-violet tints.

10 parts of this condensation product are introduced at 140° C. into a mixture from 80 parts of aluminium chloride and 20 parts of sodium chloride, the whole is stirred for ½ hour at 140–150° C., taken up in water and hydrochloric acid, heated to the boil, filtered hot and washed neutral while hot, and then dried.

The carbazol thus obtained of the formula

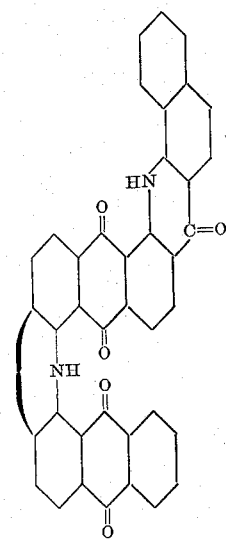

dissolves in concentrated sulfuric acid to red-brown solutions; when precipitated in water there are formed brown flocks. Cotton is dyed from violet-brown vat fast brown tints.

What we claim is:—
The dyestuff of the formula

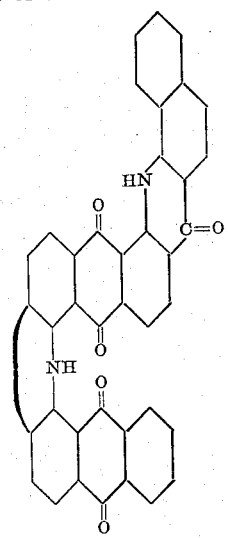

which product is a dark powder, dissolving in sulfuric acid to a red-brown solution and in water with addition of hydrosulfite and caustic soda solution to a violet-brown solution, and dyeing cotton from the vat fast level brown tints.

WILHELM MOSER.
WALTER FIORONI.